United States Patent [19]
Fujikawa et al.

[11] Patent Number: 4,463,384
[45] Date of Patent: Jul. 31, 1984

[54] TELEVISION CAMERA

[75] Inventors: Kenji Fujikawa, Yokohama; Ryusho Hirose, Yokosuka, both of Japan

[73] Assignee: Canon Kabushiki Kaisha, Tokyo, Japan

[21] Appl. No.: 467,594

[22] Filed: Feb. 18, 1983

Related U.S. Application Data

[63] Continuation of Ser. No. 216,293, Dec. 15, 1980, abandoned, which is a continuation-in-part of Ser. No. 099,890, Dec. 3, 1979, abandoned.

[30] Foreign Application Priority Data

Dec. 11, 1978 [JP] Japan ................................ 53-153374

[51] Int. Cl.³ .............................................. H04N 9/28
[52] U.S. Cl. ................................................... 358/227
[58] Field of Search ............... 358/225, 227; 352/140; 354/25, 163, 195, 198

[56] References Cited

U.S. PATENT DOCUMENTS 3,435,136 3/1969 Bachman et al. ............... 358/227 X

FOREIGN PATENT DOCUMENTS 52-2118 1/1977 Japan .................................. 358/227

Primary Examiner—Michael A. Masinick
Attorney, Agent, or Firm—Fitzpatrick, Cella, Harper & Scinto

[57] ABSTRACT

A television camera having a photo-taking lens, an image pick-up device to take an image of a photographic object formed on its image pick-up surface by the photo-taking lens, a synchronous signal generator to control operations of the pick-up device, and an electronic view finder which displays the photographic object image based on an image pick-up signal obtained by the pick-up device. In this type of camera, there are further provided a detecting device to detect a focussed state of the photographic object image formed on the above-mentioned image pick-up surface, and a pattern generator to generate a pattern signal corresponding to the detected state. On the basis of the synchronous signal from the above-mentioned synchronous signal generator, an output from the pattern generator can be displayed at a predetermined position on the image surface of the above-mentioned electronic view finder.

3 Claims, 9 Drawing Figures

TELEVISION CAMERA

This is a continuation of application Ser. No. 216,293, filed Dec. 15, 1980, now abandoned, which in turn is a continuation-in-part of U.S. application Ser. No. 099,890, filed Dec. 3, 1979, now abandoned.

BACKGROUND OF THE INVENTION

1. Field of the Invention

This invention relates to a television camera, and, more particularly, it is concerned with a television camera which displays a focussed state of a photographic object image formed on an image pick-up surface of an image pick-up device within an image plane of an electronic view finder.

2. Description of the Prior Arts

At the time of focusing an object to be televised by a television camera having an electronic view finder, not so serious a problem arises when such focusing operation is conducted within a range of a high depth of focus of a photographic lens. In case, however, the focusing operation is to be carried out in a state of the lens being full open or near to that state, experiences have often revealed that the focusing is difficult, or, even when an operator considers himself to have done the exact focusing, the object image is found out-of-focus when it is observed through a monitor having a large image plane. This is mainly due to smallness in the image plane of the electronic view finder.

SUMMARY OF THE INVENTION

The present invention has been made in view of the abovementioned problem in focusing, and therefore aims at providing a television camera which is capable of detecting the focussed state of the photographic object image formed on the image pick-up tube of the television camera, and of displaying a pattern corresponding to the focussed state in the electronic view finder.

DESCRIPTION OF THE PREFERRED EMBODIMENTS

In the following, a preferred embodiment of the television camera according to the present invention will be explained in reference to the accompanying drawings.

Figure 1:
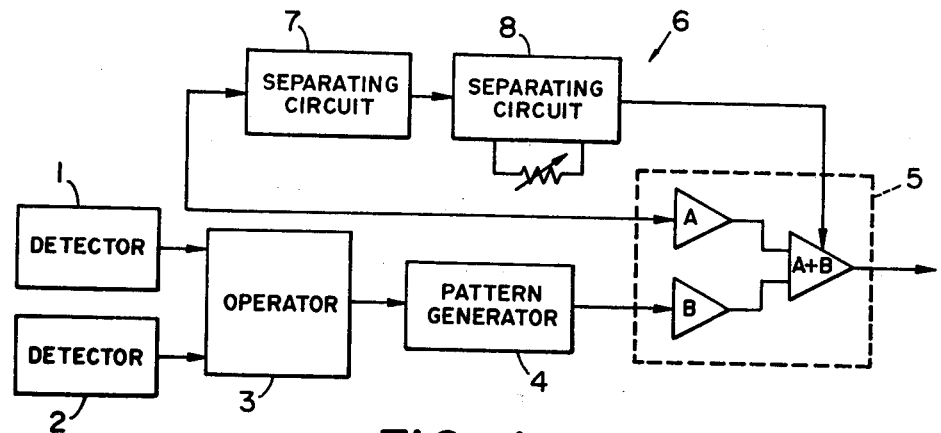
FIG. 1 is an electrical circuit diagram for the television camera according to the present invention.
Figure 4:
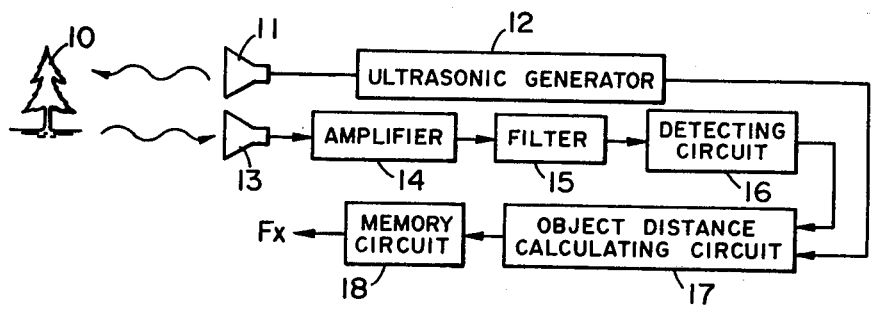
FIG. 4 is a diagram showing an example of the photographic object distance detector in FIG. 1.
Figure 5:
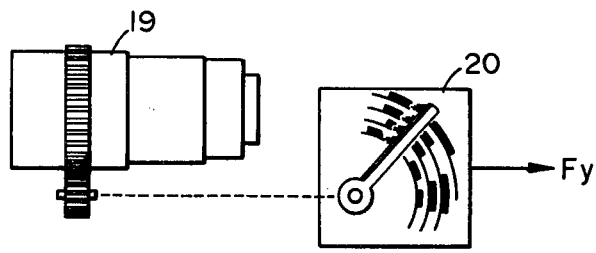
FIG. 5 is a schematic view showing an example of the current position information detector in FIG. 1.

FIG. 1 is a diagram showing a focussed state display circuit. In this circuit diagram, a reference numeral 1 designates a photographic object distance detector which generates a signal corresponding to a distance of the photographic object. The detector may be either a double-image coincidence system, or a super-sonic wave reflection system. FIG. 4 is a diagram showing an ultrasonic or supersonic type detector as a representative of the photographic object distance detector 1 in FIG. 1. Designated at 10 is a photographic object; 11, a transmitter for transmitting the ultrasonic wave; 12, an ultrasonic wave generating circuit; 13, a receiver for receiving the wave reflected from the photographic object; 14, an amplifier; 15, a filter for removing higher harmonics and noises; 16, a circuit for counting the time lag of the received wave with respect to the transmitted wave; 17, a circuit for converting the time lag into the object distance; and 18, a circuit for temporarily storing the sampled distance information until the end of the processing, and producing a digital output Fx. Referring again to FIG. 1, a reference numeral 2 designates a present position detector including a potentiometer, etc., which detects the present position of a focusing lens in the image pick-up lens system, i.e., a current distance of the photographic object in focus. FIG. 5 is a schematic view showing an example of the detector 2, in FIG. 1, for detecting the present in-focus position information of the photo-taking lens. Designated at 19 is a focusing ring for the lens; and 20, a digital code plate mechanically associated with the focusing ring and producing an output Fy.

The outputs Fx and Fy from the detectors 1 and 2 are applied to a comparison operator 3 which detects the difference between the photographic object distance and the current in-focus object distance corresponding to the current position of the focusing lens, and which operates the rotational direction and quantity of the focusing lens.

Figure 6:
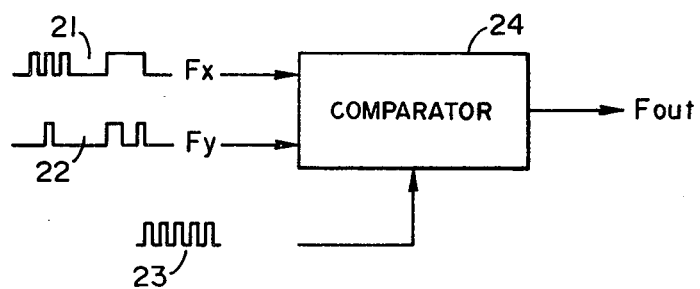
FIG. 6 is a diagram showing an example of the operational circuit in FIG. 1.
Figure 7:
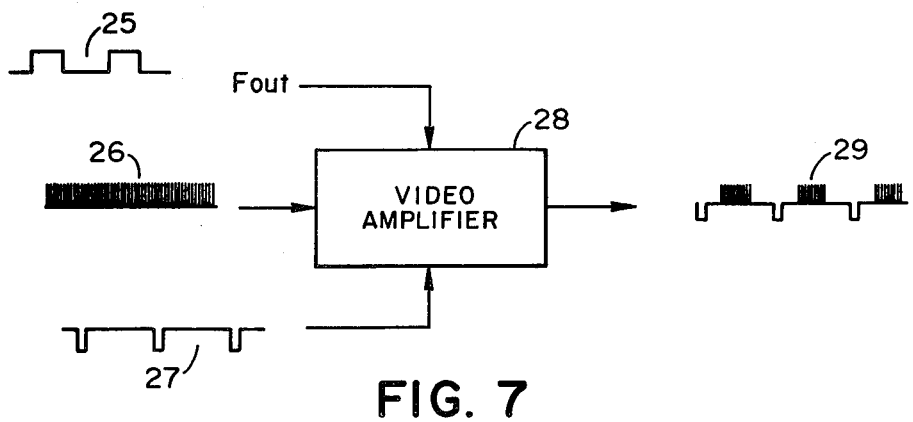
FIG. 7 is a diagram showing an example of the pattern generator in FIG. 1.

FIG. 6 is a diagram showing an example of the comparison operator circuit 3 in FIG. 1. Designated at 21 is the bit-serial information Fx of the object distance; 22, the bit-serial information Fy of the current in-focus position of lens; 23, a clock signal in synchronism with the serial data; and 24, a digital serial-data comparator for comparing Fx with Fy to calculate the amount of near-focus or far-focus, and producing an output $F_{out}$. An output from the operational circuit is introduced as an input into a pattern generator 4, from which an output is produced in the form of a pattern corresponding to the input thereinto. FIG. 7 is a diagram showing an example of the pattern generator 4 in FIG. 1. Designated at 25 is the $F_{out}$ data; 26, a clock signal for generating the white level of the video; and 27, the horizontal synchronizing signal of the video. Designated at 28 is a gated video amplifier which generates a clock signal at a predetermined position synchronized with the horizontal synchronizing signal of the video, i.e. in the interval of the output $F_{out}$, and which may be an exclusive integrated circuit available, e.g., as Motorola "Mc 1445". Designated at 29 is a video signal for displaying in the monitoring image plane the amount of focus deviation. This output is introduced as an input into one of input terminals of a video-composite circuit 5.

Figure 2:
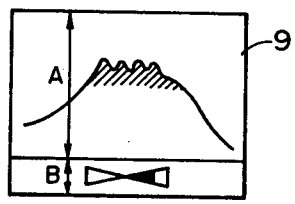
FIG. 2 shows an image plane of the electronic view finder obtained by the electrical circuit shown in FIG. 1.
Figure 3:
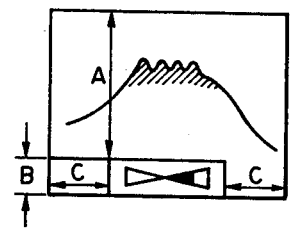
FIG. 3 also shows an image plane of the electronic view finder obtained by another embodiment.
Figure 8:
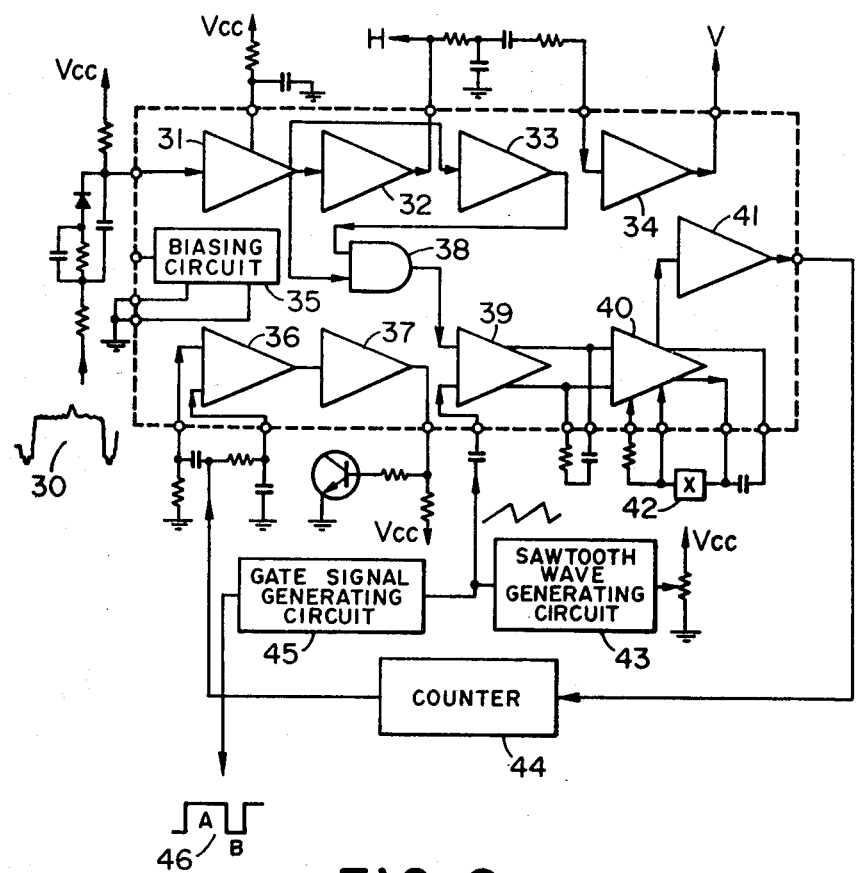
FIG. 8 is an illustrative diagram for the synchronous signal separating circuit and the control signal generating circuit in FIG. 1.
Figure 9:
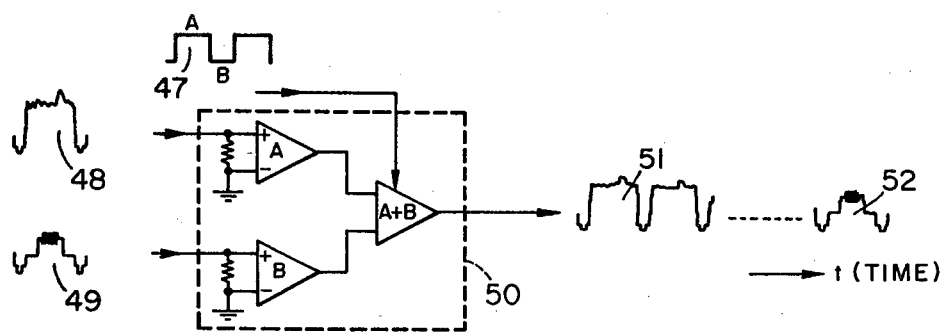
FIG. 9 is a diagram showing an example of the video-composite circuit in FIG. 1.

On the other hand, a video signal from the image pick-up tube is divided into two signal components; the one is supplied to a recording device, and the other is supplied to the electronic view finder. The video signal to be supplied to the electronic view finder is introduced as an input into a gate signal generating circuit 6 and the other input terminal of the video-composite circuit 5. FIG. 9 is a diagram showing an example of the composite circuit 5 in FIG. 1. Designated at 47 is an A B gate signal; 48, a video signal of the photographic object; 49, a video signal for displaying the amount of focus deviation; 50, a circuit for changing-over the video signals on the basis of the A B gate signal; and 51 and 52, composite video signals from the circuit 50, the composite video signals being applied to the electronic view finder to provide the composite image plane such as shown in FIG. 2 or 3. An output from the gate signal generating circuit 6 is introduced as an input into a synchronous signal separating circuit 7 which extracts a vertical synchronizing signal from the video signal. This vertical synchronizing signal is introduced as an input into a control signal generating circuit 8. This control signal generating circuit generates, by this vertical synchronizing signal input, a gate signal "1" for an area A in the image plane of the electronic finder 9 shown in FIG. 2, and a gate signal "0" for an area B therein. The gate signal is introduced as an input into a gate terminal of the video-composite circuit 5. From an output terminal of this video-composite circuit 5, an image signal from the image pick-up device is produced as an output when the gate signal is "1", while an image signal from the pattern generator 4 is produced as an output when the gate signal is "0". The output from the video-composite circuit 5 is then fed into the electronic view finer 9. Accordingly, an object image is displayed in the area A of the electronic view finder 9, and a pattern showing the in-focus state of the image in the area B, as shown in FIG. 2. The pattern shown in FIG. 2 indicates that the focusing lens needs be rotated rightward for a quantity as blackened. Extinction of this blackened portion by the rightward movement of the focusing lens indicates the in-focus state of the photographic object. FIG. 8 is an illustrative for the synchronous signal separating circuit 7 and the control signal generating circuit 8 in FIG. 1. Designated at 30 is a video signal of the object corresponding to the area A in FIG. 2; 31, a synchronous separating circuit; 32, a separated horizontal synchronizing amplifier; 33, a separated vertical synchronizing amplifier; 34, a vertical synchronizing output circuit; 35, a biasing circuit; 36, a pulse width control; 37, a pre-driver; 38, a gate; 39, a horizontal AFC circuit; 40, a horizontal variable oscillator (VCO); 41, an oscillating output circuit; 42, a filter for 32.5 KHZ; 43, a variable sawtooth wave generating circuit for determining the areas A and B; 44, a counter for counting-down, correspondingly to the area A, the horizontal synchronizing signal; 45, a circuit for differentiating the sawtooth wave from the circuit 43, and generating a gate signal for determining the areas A and B; and 46, an output wave form the gate signal. Each block constituting the circuit in FIG. 1 is well known. For instance, the synchronous signal separating circuit 7 is one which is produced and sold by Tokyo Shibaura Electric Co., Ltd., Japan as a commodity code "TA151P", and the video-composite circuit 5 is one which is produced and sold by Motorola Semiconductor Products, Inc., U.S.A. as a commodity code "Mc1445".

In the embodiment as explained in reference to FIGS. 1 and 2, the bottom portion of the image plane is entirely displayed by a pattern from the pattern generator 4, although it is possible to display only the bottom center portion of the image plane by this pattern as shown in FIG. 3. In this case, the horizontal synchronizing signal is also used as the gate signal. Further, the pattern to be displayed is not limited to a pattern, but a numerical figure may be used. Furthermore, it is feasible to display the object image and the pattern not only alternatively, but also overlappingly.

What we claim is:

1. A television camera comprising:
    an image pick-up device for providing a video signal, said device having an image pick-up surface;
    an object lens for forming an image of an object on the image pick-up surface, and means for adjusting said object lens to provide the image in a focused state on the image pick-up device;
    an electronic display device for displaying the image video signal;
    means for generating a video output signal representing the focus state of said image formed on the image pick-up surface; and
    means for applying said generated video output signal to said electronic display device for display with said image video signal.

2. A television camera comprising:
    an image forming means for forming a light image of an object;
    an image pick-up means for receiving thereon the object image formed by said image forming means and for providing a video signal corresponding to said image;
    an electronic display means for electronically displaying the video signal to reproduce said image;
    a focus detecting means for detecting the state of focus of the image formed on said image pick-up means, and for producing an output signal corresponding to said focus state; and
    means coupled from said focus detecting means to said electronic display means for providing a display of said output signal corresponding to said focus state of the image.

3. A television camera comprising:
    a photographic lens;
    an image pick-up device for converting an image object, viewed through said lens, to produce a video signal;
    an electronic view finder for displaying the video signal;
    means for detecting the distance of said image pick-up device from the viewed object;
    means for detecting the in-focus object distance condition of said lens;
    means for comparing the detected distance of said image pick-up device from the viewed object and the detected in-focus object distance condition of said lens; and
    means for adjusting said lens, in response to a signal from said comparing means.

* * * * *